United States Patent
Zhang et al.

(10) Patent No.: US 12,353,390 B2
(45) Date of Patent: Jul. 8, 2025

(54) METHOD AND APPARATUS FOR STORING DATA

(71) Applicants: Beijing Wodong Tianjun Information Technology Co., Ltd., Beijing (CN); Beijing Jingdong Century Trading Co., Ltd., Beijing (CN)

(72) Inventors: Ning Zhang, Beijing (CN); Yehui Liu, Beijing (CN); Xiangbin Gao, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 18/039,245

(22) PCT Filed: Jan. 28, 2022

(86) PCT No.: PCT/CN2022/074561
§ 371 (c)(1),
(2) Date: May 28, 2023

(87) PCT Pub. No.: WO2022/174734
PCT Pub. Date: Aug. 25, 2022

(65) Prior Publication Data
US 2024/0037084 A1    Feb. 1, 2024

(30) Foreign Application Priority Data
Feb. 18, 2021    (CN) .......................... 202110187129.8

(51) Int. Cl.
*G06F 16/20* (2019.01)
*G06F 16/215* (2019.01)
*G06F 16/22* (2019.01)

(52) U.S. Cl.
CPC ........ *G06F 16/2282* (2019.01); *G06F 16/215* (2019.01)

(58) Field of Classification Search
CPC .......................... G06F 16/2282; G06F 16/215
See application file for complete search history.

(56) References Cited

U.S. PATENT DOCUMENTS

| | | | | |
|---|---|---|---|---|
| 5,604,854 | A | * | 2/1997 | Glassey .................. G06F 40/18 715/788 |
| 8,656,270 | B2 | * | 2/2014 | Rui ......................... G06F 40/18 707/723 |

(Continued)

FOREIGN PATENT DOCUMENTS

| | | |
|---|---|---|
| CN | 101127034 A | 2/2008 |
| CN | 108427725 A | 8/2018 |

(Continued)

OTHER PUBLICATIONS

International Search Report for PCT/CN2022/074561, dated Apr. 14, 2022, 4 pgs.

Primary Examiner — Daniel A Kuddus
(74) Attorney, Agent, or Firm — Blank Rome LLP

(57) ABSTRACT

A method and apparatus for storing data are provided. The method comprises: obtaining a dataset to be stored and a storage model, wherein said dataset comprises a source storage parameter, and the storage model comprises a target storage parameter; in response to determining that the source storage parameter is consistent with the target storage parameter, obtaining a storage key value of said dataset; obtaining raw data that is written into said dataset for the first time and corresponds to the source storage parameter and change data that is in said dataset and corresponds to the (Continued)

source storage parameter; and storing the raw data and the change data in the storage model according to the storage key value.

20 Claims, 7 Drawing Sheets

(56) References Cited

U.S. PATENT DOCUMENTS

| | | | |
|---|---|---|---|
| 9,948,819 B2 | 4/2018 | Ryuu | |
| 10,055,715 B1* | 8/2018 | Grassadonia | G06Q 20/36 |
| 10,243,939 B2* | 3/2019 | Campagna | H04L 63/0884 |
| 11,474,728 B2* | 10/2022 | Gallaher | G06F 11/1446 |
| 11,809,429 B2 | 11/2023 | Chen et al. | |
| 2005/0071379 A1* | 3/2005 | Kekre | G06F 3/0605 |
| 2008/0046804 A1* | 2/2008 | Rui | G06F 40/18 715/212 |
| 2013/0275656 A1* | 10/2013 | Talagala | G06F 12/0246 711/103 |
| 2016/0077926 A1* | 3/2016 | Mutalik | G06F 16/1844 711/162 |
| 2017/0085743 A1* | 3/2017 | Ryuu | H04N 1/32432 |
| 2017/0124050 A1* | 5/2017 | Campbell | G06F 3/165 |
| 2017/0183774 A1* | 6/2017 | Kon | C23C 16/545 |
| 2017/0236104 A1* | 8/2017 | Biton | G06Q 20/389 705/64 |
| 2018/0183774 A1* | 6/2018 | Campagna | H04L 9/3247 |
| 2018/0210828 A1* | 7/2018 | Zhou | G06F 3/0629 |
| 2019/0102163 A1* | 4/2019 | Witherspoon | G06F 8/65 |
| 2019/0272335 A1 | 9/2019 | Liu et al. | |
| 2020/0372039 A1 | 11/2020 | Hu et al. | |
| 2021/0216648 A1* | 7/2021 | Child | G06F 21/604 |

FOREIGN PATENT DOCUMENTS

| | | |
|---|---|---|
| CN | 108684071 A | 10/2018 |
| CN | 109669995 A | 4/2019 |
| CN | 110599168 A | 12/2019 |
| CN | 110599169 A | 12/2019 |
| CN | 110798818 A | 2/2020 |
| CN | 111273872 A | 6/2020 |
| CN | 111680799 A | 9/2020 |
| CN | 111767169 A | 10/2020 |
| CN | 111949710 A | 11/2020 |
| CN | 113792038 A | 12/2021 |
| EP | 0483039 A2 * | 4/1992 |
| RU | 2666272 C2 | 9/2018 |

* cited by examiner

METHOD AND APPARATUS FOR STORING DATA

CROSS-REFERENCE TO RELATED APPLICATIONS

This application is a national stage of International Application No. PCT/CN2022/074561, filed on Jan. 28, 2022, which claims the priority from Chinese Patent application Ser. No. 202110187129.8, filed on Feb. 18, 2021 and entitled "Method and Apparatus for Storing Data". Both of the aforementioned applications are hereby incorporated by reference in their entireties.

TECHNICAL FIELD

The present disclosure relates to the field of computer technology, and specifically to a method and apparatus for storing data.

BACKGROUND

With the advent of the data era, data has become one of important assets. An existing method for storing data is to store, based on a data writing cycle, data in each writing cycles one by one.

However, there are problems of a low storage efficiency and a waste of storage resources in existing methods for storing data.

SUMMARY

The present disclosure provides a method and apparatus for storing data, an electronic device, a computer readable medium and a computer program product.

Some embodiments of the present disclosure provide a method for storing data, including: acquiring a to-be-stored data set and a storage model, the to-be-stored data set comprising source storage parameters, and the storage model comprising target storage parameters; acquiring a storage key value of the to-be-stored data set, in response to determining that the source storage parameters are consistent with the target storage parameters; acquiring original data corresponding to the source storage parameters and written into the to-be-stored data set for first time and change data corresponding to the source storage parameters in the to-be-stored data set; and storing the original data and the change data into the storage model according to the storage key value.

In some embodiments, the method for storing data includes: determining a missing parameter using the source storage parameters and the target storage parameters, in response to determining that the source storage parameters are inconsistent with the target storage parameters, wherein the missing parameter comprises: a storage parameter existing in the to-be-stored data set but not existing in the storage model, or a storage parameter not existing in the to-be-stored data set but existing in the storage model.

In some embodiments, In some embodiments, the method for storing data includes: adding the missing parameter to the storage model in response to determining that the missing parameter does not exist in the storage model; or acquiring, in response to determining that the missing parameter does not exist in the to-be-stored data set, to-be-stored data corresponding to the missing parameter using an original acquiring approach of the to-be-stored data set, and adding the missing parameter and the to-be-stored data corresponding to the missing parameter to the to-be-stored data set.

In some embodiments, the acquiring a storage key value of the to-be-stored data set comprises: for each preset storage key value in at least one preset storage key value, acquiring a distribution result of to-be-stored data in the to-be-stored data set after clustering is performed on the to-be-stored data according to the preset storage key value; and determining that the preset storage key value is a target storage key value, in response to determining that the distribution result satisfies a preset condition.

In some embodiments, the method for storing data includes: marking data except the original data and the change data in the to-be-stored data set as first data, and wherein the storing the original data and the change data into the storage model according to the storage key value comprises: storing data except the data marked as the first data in the to-be-stored data set into the storage model according to the storage key value.

In some embodiments, the storing the original data and the change data into the storage model according to the storage key value comprises: storing the original data, at least one duration corresponding to the original data, the change data and at least one duration corresponding to the change data into the storage model according to the storage key value, and obtaining a stored data set, wherein the duration is used to represent a time cycle in which data persists, and the method comprises: extracting original data from the stored data set according to the duration of the original data; extracting change data from the stored data set according to the duration of the change data; and determining that the stored data set is a target stored data set, in response to determining that a data set composed of the extracted original data and the extracted change data is consistent with to-be-stored data in the to-be-stored data set.

In some embodiments, the method for storing data includes; determining a database parameter according to a data feature of data in the to-be-stored set, and wherein the storing the original data and the change data into the storage model comprises: updating the storage model using the database parameter; and storing the original data and the change data into an updated storage model.

Some embodiments of the present disclosure provide a method for storing data, including: performing the above method for storing data, in response to determining that a to-be-stored data set satisfies a preset condition, wherein the preset condition comprises at least one of: a changing speed of data in the to-be-stored data set being less than a preset threshold, or an amount of the data in the to-be-stored data set being greater than a preset data amount.

Some embodiments of the present disclosure provide a method for storing data, including: performing the above method for storing data, in response to determining that a current moment is within a preset data processing time period.

Some embodiments of the present disclosure provide an apparatus for storing data, including: a first acquiring unit, configured to acquire a to-be-stored data set and a storage model, the to-be-stored data set comprising source storage parameters, and the storage model comprising target storage parameters; a second acquiring unit, configured to acquire a storage key value of the to-be-stored data set, in response to determining that the source storage parameters are consistent with the target storage parameters; a third acquiring unit, configured to acquire original data corresponding to the source storage parameters and written into the to-be-stored data set for first time and change data corresponding to the source storage parameters in the to-be-stored data set; and a storing unit, configured to store the original data and the change data into the storage model according to the storage key value.

In some embodiments, the apparatus for storing data comprises: a data verifying unit, configured to determine a missing parameter using the source storage parameters and the target storage parameters, in response to determining that the source storage parameters are inconsistent with the target storage parameters. Here, the missing parameter comprises: a storage parameter existing in the to-be-stored data set but not existing in the storage model, or a storage parameter not existing in the to-be-stored data set but existing in the storage model.

In some embodiments, the apparatus for storing data comprises: a first data verifying module, configured to add the missing parameter to the storage model in response to determining that the missing parameter does not exist in the storage model; or acquire, in response to determining that the missing parameter does not exist in the to-be-stored data set, to-be-stored data corresponding to the missing parameter using an original acquiring approach of the to-be-stored data set, and add the missing parameter and the to-be-stored data corresponding to the missing parameter to the to-be-stored data set.

In some embodiments, the second acquiring unit comprises: an acquiring module, configured to, for each preset storage key value in at least one preset storage key value, acquire a distribution result of to-be-stored data in the to-be-stored data set after clustering is performed on the to-be-stored data according to the preset storage key value; and a determining module, configured to determine that the preset storage key value is a target storage key value, in response to determining that the distribution result satisfies a preset condition.

In some embodiments, the apparatus comprises: a marking module, configured to mark data except the original data and the change data in the to-be-stored data set as first data. The storing unit comprises: a first storing module, configured to store data except the data marked in the to-be-stored data set as the first data into the storage model according to the storage key value.

In some embodiments, the storing unit comprises: a second storing module, configured to store the original data, at least one duration corresponding to the original data, the change data and at least one duration corresponding to the change data into the storage model according to the storage key value, and obtain a stored data set. Here, the duration is used to represent a time cycle in which data persists. The apparatus comprises: a first extracting module, configured to extract original data from the stored data set according to the duration of the original data; a second extracting module, configured to extract change data from the stored data set according to the duration of the change data; and a validating module, configured to determine that the stored data set is a target stored data set, in response to determining that a data set composed of the extracted original data and the extracted change data is consistent with to-be-stored data in the to-be-stored data set.

In some embodiments, the apparatus for storing data comprises: a database parameter acquiring unit, configured to determine a database parameter according to a data feature of data in the to-be-stored data set. The storing unit comprises: an updating module, configured to update the storage model using the database parameter; and a third storing module, configured to store the original data and the change data into an updated storage model.

Some embodiments of the present disclosure provide an apparatus for storing data, including: a pre-verifying unit, configured to perform the above method for storing data, in response to determining that a to-be-stored data set satisfies a preset condition, where the preset condition comprises at least one of: a changing speed of data in the to-be-stored data set being less than a preset threshold, or an amount of the data in the to-be-stored data set being greater than a preset data amount.

Some embodiments of the present disclosure provide an apparatus for storing data, including: a pre-verifying unit, configured to perform the above method for storing data, in response to determining that a to-be-stored data set satisfies a preset condition.

Some embodiments of the present disclosure provide an electronic device, and the electronic device includes: one or more processors; and a storage apparatus configured to store one or more programs, where the one or more programs, when executed by the one or more processors, cause the one or more processors to implement the above method for storing data.

Some embodiments of the present disclosure provide a computer readable storage medium storing computer instructions, where, the computer instructions are used to cause the computer to perform the above method for storing data.

Some embodiments of the present disclosure provide a computer readable medium storing a computer program, where the program, when executed by a processor, implements the above method for storing data.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure. Here.

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

Figure 1:
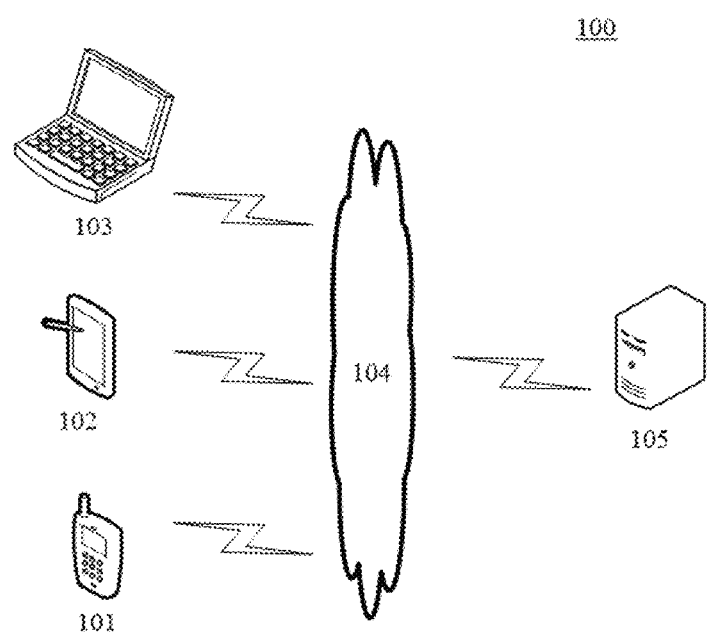
FIG. 1 is a diagram of an exemplary system architecture in which an embodiment of the present disclosure may be applied.

FIG. 1 illustrates an exemplary system architecture 100 in which an embodiment of a method for storing data or an apparatus for storing data according to the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may use the terminal devices 101, 102 and 103 to interact with the server 105 via the network 104, to receive or send a message, etc. Various client applications (e.g., a navigation application, a recommendation application, a chat application, a shopping application, a financial application, an image application, and a video application) may be installed on the terminal devices 101, 102 and 103.

The terminal devices 101, 102 and 103 may be various electronic devices having a display screen and supporting the reception of messages of the server, the electronic devices including, but not limited to, a smartphone, a tablet computer, an e-book reader, an electronic player, a portable computer, a desktop computer, and the like.

The terminal devices 101, 102 and 103 may be hardware or software. When being the hardware, the terminal devices 101, 102 and 103 may be various electronic devices. When being the software, the terminal devices 101, 102 and 103 may be installed in the electronic devices listed above. The terminal devices 101, 102 and 103 may be implemented as a plurality of pieces of software or a plurality of software modules (e.g., software or software modules for providing a distributed service), or as a single piece of software or a single software module, which will not be specifically defined here.

The server 105 may acquire, through the terminal devices, a to-be-stored data set and a storage model, the to-be-stored data set comprising a source storage parameter, and the storage model comprising a target storage parameter; acquire a storage key value of the to-be-stored data set, in response to determining that the source storage parameter is consistent with the target storage parameter; and acquire, in the to-be-stored data set, original data corresponding to the storage key value and change data corresponding to the storage key value, and store the original data and the change data into the storage model according to the storage key value.

It should be noted that the method for storing data provided by the embodiments of the present disclosure is generally performed by the server 105, and correspondingly, the apparatus for storing da-a is generally provided in the server 105.

It should be appreciated that the numbers of the terminal devices, the networks and the servers in FIG. 1 are merely illustrative. Any number of terminal devices, networks and servers may be provided based on actual requirements.

According to the method and apparatus for storing data provided in the present disclosure, the storage key value of the to-be-stored data set is acquired. The original data written into the to-be-stored data set for the first time and the change date in the to-be-stored data set are acquired, and the original data and the change data are stored according to the storage key value. The data such as data periodically written or historical data can be stored/archived in a lightweight manner, which improves an efficiency in storing data, and saves storage resources for storing data.

Figure 2:
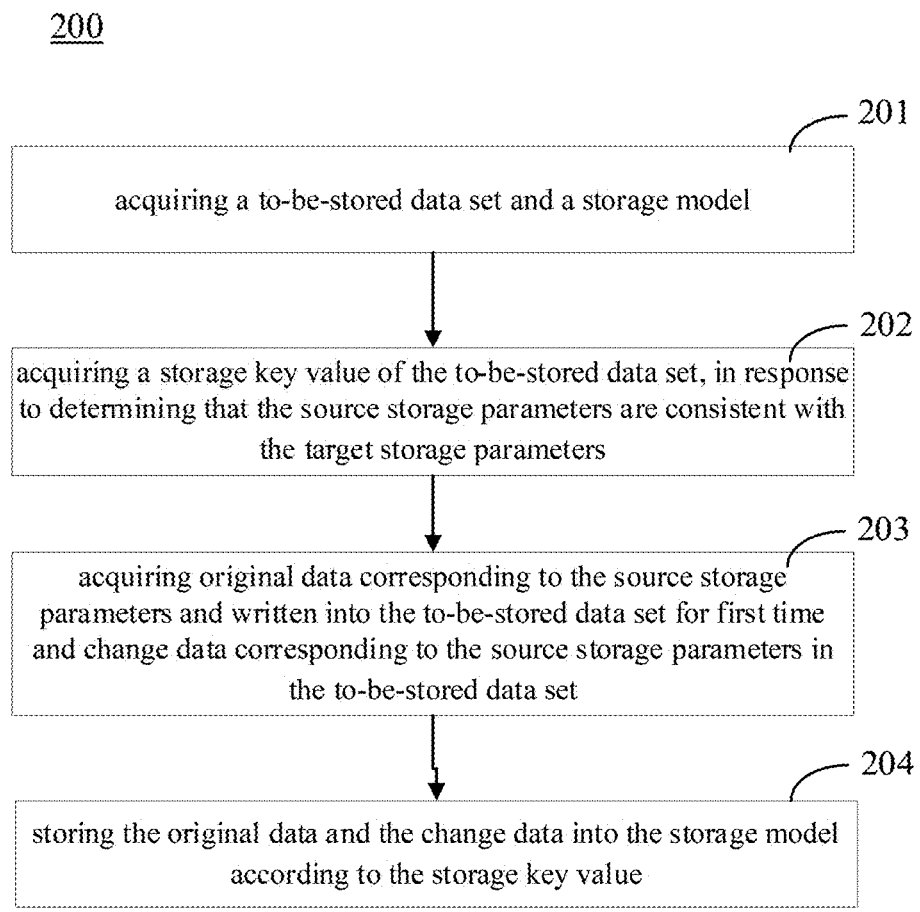
FIG. 2 is a flowchart of an embodiment of a method for storing data according to the present disclosure.

Further referring to FIG. 2, FIG. 2 illustrates a flow 200 of an embodiment of a method for storing data according to the present disclosure, including the following steps.

Step 201, acquiring a to-be-stored data set and a storage model, the to-be-stored data set comprising source storage parameters, and the storage model comprising target storage parameters.

In this embodiment, an executing body (e.g., the server 105 shown in FIG. 1) of the method for storing data may acquire the to-be-stored data set and the storage model through a wired or wireless means. Here, the storage model may be used to store to-be-stored data, or used to archive, organize or persistently store the to-be-stored data. The storage model may be a data storage carrier such as a database for storing data, or a file for storing data. The storage model includes the target storage parameters corresponding to the to-be-stored data, and the target storage parameters may be preset, or may be recognized and acquired by the storage model from the to-be-stored data set through a field recognition method.

In this embodiment, the to-be-stored data set includes at least one source storage parameter and to-be-stored data/to-be-archived data respectively corresponding to each source storage parameter in the at least one source storage parameter. As an example, the source storage parameter may refer to an item number, and the corresponding to-be-stored data may be the number "001." As another example, the source storage parameter may refer to a network type, and the corresponding to-be-stored data may be "wireless network/wired network," etc.

Step 202, acquiring a storage key value of the to-be-stored data set, in response to determining that the source storage parameters are consistent with the target storage parameters.

In this embodiment, if it is determined that the source storage parameters are consistent with the target storage parameters, the storage key value of the to-be-stored data set can be acquired. The storage key value refers to an index keyword of the to-be-stored data, a key value in a key-value pair database, or a data tag obtained by dividing the to-be-stored data into different categories. As an example, if the to-be-stored data in the to-be-stored data set refers to inventory information of a certain electronic commerce platform, the storage key value may refer to an item category, an item size, or the like. As another example, if the to-be-stored data in the to-be-stored data set refers to an exam result of a certain school, the storage key value may refer to an exam subject ox an exam score range.

Step 203, acquiring original data corresponding to the source storage parameters and written into the to-be-stored data set for first time and change data corresponding to the source storage parameters in the to-be-stored data set.

In this embodiment, the original data corresponding to the source storage parameters and written into the to-be-stored data set for the first time and the change data obtained by a data update operation or a data overwrite operation that is performed on the original data after the original data is written into the to-be-stored data set is acquired.

As an example, in a certain warehouse, the inventory information of each day is written into the to-be-stored data set on the day, pieces of inventory information corresponding to respective source storage parameters and written in from the first day to the fifth day is identical (i.e., the inventory of the warehouse does not change from the first day to the fifth day), the inventory changes on the sixth day (e.g., the inventory increases or the inventory decreases), and the inventory information on the seventh day does not change as compared with the inventory information on the sixth day. Accordingly, the inventory information written in on the first day is the original data written into the to-be-stored data set for the first time, and the inventory information written in on the sixth day is the change data obtained after the data update operation is performed on the original data. Therefore, the acquired original data and change data are the data written in on the first day and the data written in on the sixth day by the warehouse.

As another example, the to-be-stored data set is a failure form of a certain network, and the to-be-stored data is failure information of the network. The failure information written into the failure form when a network detection is performed for the first time is identical with the failure information written into the failure form when the network detection is performed for the second time and for the third time (i.e., the network failures of the network detected when the network detection is performed for the second time and for the third time are the same as the network failure detected when the network detection is performed for the first time), and a new failure not occurring in the foregoing detection processes is detected when the network detection is performed for the fourth time. Accordingly, the failure information written into the failure form when the network detection is performed for the first time is the original data, and the failure information written into the failure form when the network detection is performed for the fourth time is the change data. Therefore, the acquired original data and change data are respectively the data written into the to-be-stored data set when the network detection is performed for the first time and the data written into the to-be-stored data set when the network detection is performed for the fourth time.

Step 204, storing the original data and the change data into the storage model according to the storage key value.

In this embodiment, the acquired original data and change data are stored into the storage model according to the storage key value. The target storage parameters in the storage model are identical with the source storage parameters, and the original data and the change data are data corresponding to their respective source storage parameters. Therefore, when the original data and the change data are stored into the storage model, the original data and the change data can be associatively stored with their respective target storage parameters in the storage model.

For example, the source storage parameter and the corresponding original data are respectively "the number of remaining inventory items, 100," and the source storage parameter and the corresponding change data are respectively "inventory update time, Monday." Since the target storage parameter in the storage model is a storage parameter consistent with the source storage parameter, the storage model includes the target storage parameters "the number of remaining inventory items" and "inventory update time." At this point, when the original data and the change data are stored into the storage model, the original data "100" can be associatively stored with the target storage parameter "the number of remaining inventory items", and the change data "Monday" can be associatively stored with the target storage parameter "inventory update time", which makes it easy to use the storage model to perform a data query. Alternatively, the original data and the change data can be directly stored into the storage model without being associatively stored with the target storage parameters, which simplifies the data storage and improves the data storage efficiency.

In this embodiment, the storage key value may be one of a plurality of target storage parameters. For example, the target storage parameter "item name" may be used as the storage key value, and then, the original data and the change data that contain the same item name are stored into the same storage model or into the same subunit in the storage model. The storage key value may alternatively be information unrelated to the target storage parameter. For example, the target storage parameters may be "network capacity," "network number" and "network status." At this point, "network type" may be used as the storage key value, and then the original data and the change data that correspond to the same network type are stored into the same storage model or into the same subunit in the storage model.

According to the method for storing data provided in this embodiment, the to-be-stored data set and the storage model are acquired. If it is determined that the source storage parameters in the to-be-stored data set are consistent with the target storage parameters in the storage model, the storage key value of the to-be-stored data set is acquired. The original data corresponding to the source storage parameters and written into the to-be-stored data set for the first time and the change data corresponding to the source storage parameters in the to-be-stored data set are acquired, and the original data and the change data are stored into the storage model according to the storage key value. The data such as data periodically written (e.g., network detection data of each day that is written into the data set on the day) or historical data can be stored/archived in a lightweight manner, which can improve the data storage efficiency, and save software/hardware resources for storing data.

Alternatively, the method for storing data includes: determining a missing parameter using the source storage parameters and the target storage parameters, in response to determining that the source storage parameters are inconsistent with the target storage parameters. Here, the missing parameter includes: a storage parameter existing in the to-be-stored data set but not existing in the storage model, or a storage parameter not existing in the to-be-stored data set but existing in the storage model.

In this embodiment, if it is determined that the source storage parameters are inconsistent with the target storage parameters, the source storage parameters and the target storage parameters may be compared one by one. If a certain storage parameter is a source storage parameter, but the storage parameter is not a target storage parameter, the storage parameter is determined as a missing parameter. Alternatively, if a certain storage parameter is a target storage parameter, but the storage parameter is not a source storage parameter, the storage parameter is determined as a missing parameter. That is, a storage parameter existing in the to-be-stored data set but not existing in the storage model is determined as a missing parameter, or a storage parameter not existing in the to-be-stored data set but existing in the storage model is determined as a missing parameter.

In this embodiment, by performing a consistency check on the source storage parameters and the target storage parameters, a missing storage parameter in the source storage parameters can be determined, or a missing storage parameter in the target storage parameters can be determined. A missing parameter and corresponding data can be acquired in the process of archiving and storing data, thereby improving an accuracy of storing data.

Alternatively, the method for storing data includes: adding the missing parameter to the storage model in response to determining that the missing parameter does not exist in the storage model; or in response to determining that the missing parameter does not exist in the to-be-stored data set, acquiring to-be-stored data corresponding to the missing parameter using an original acquiring approach of the to-be-stored data set, and adding the missing parameter and the to-be-stored data corresponding to the missing parameter to the to-be-stored data set.

In this embodiment, if it is determined that the missing parameter does not exist in the storage model, that is, the storage parameter included in the to-be-stored data set is missing in the storage model, the missing parameter can be added to the storage model to ensure the consistency of the target storage parameters in the storage model and the source storage parameters in the to-be-stored data set.

In this embodiment, if it is determined that the missing parameter does not exist in the to-be-stored data set, that is, the storage parameter included in the storage model is missing in the to-be-stored data set, the to-be-stored data corresponding to the missing parameter can be acquired using the original acquiring approach of the to-be-stored data set, and the missing parameter and the corresponding to-be-stored data can be added to the to-be-stored data set. For example, if it is determined that the missing parameter "order number" does not exist in the to-be-stored data set, the original acquisition approach of the to-be-stored data set can be used to acquire the to-be-stored data (e.g., a number "001," a number "002" and a number "003") corresponding to the "order number," and the missing parameter "order number," and the numbers "001," "002" and "003" can be added to the to-be-stored data set. In this example, the original acquisition approach of the to-be-stored data set may refer to, for example, reading order flow information of an e-commerce platform, reading the customer order information of a logistics system, or the like.

In this embodiment, by supplementing the missing parameter in the storage model, or by supplementing the missing parameter in the to-be-stored data set and the corresponding data to the to-be-stored/to-be-archived data set, the accuracy of storing the to-be-stored data can be improved, and an integrity of the stored data can be ensured.

Alternatively, the acquiring a storage key value of the to-be-stored data set includes: for each preset storage key value in at least one preset storage key value: acquiring a distribution result of to-be-stored data in the to-be-stored data set after clustering is performed on the to-be-stored data according to the preset storage key value; and determining that the preset storage key value is a target storage key value, in response to determining that the distribution result satisfies a preset condition In this embodiment, a plurality of preset storage key values may be set in advance. For each storage key value in the plurality of preset storage key values, the distribution result of the to-be-stored data in the to-be-stored data set after the clustering is performed on the to-be-stored data according to the preset storage key value is acquired. If it is determined that the distribution result corresponding to the preset storage key value satisfies the preset condition, the preset storage key value can be determined as the target storage key value.

For example, a first storage key value, a second storage key value and a third storage key value may be set in advance. Clustering is performed on the to-be-stored data in the to-be-stored data set respectively according to the three preset storage key values, and a first distribution result, a second distribution result and a third distribution result are respectively obtained. The first distribution result is that the to-be-stored data is divided into 10 categories, the second distribution result is that the to-be-stored data is divided into S categories, and the third distribution result is that the to-be-stored data is divided into 2 categories. If the preset condition refers to that the distribution of the to-be-stored data after the clustering represents that to-be-stored data is divided into not greater than 7 categories, one of the first storage key value and the second storage key value can be used as the target storage key value. If the preset condition refers to that the distribution of the to-be-stored data after the clustering is performed on the to-be-stored data according to the storage key value is the most concentrated distribution in each distribution result, the first storage key value is the target storage key value in this example.

In this embodiment, the target storage key value is determined according to the distribution of the to-be-stored data obtained after the clustering is performed based on the preset storage key value, and data is stored based on the target storage key value, which can improve a compression ratio of the data, thereby saving the resources for data storage.

Alternatively, the method for storing data includes: marking data except the original data and the change data as first data in the to-be-stored data set. The storing the original data and the change data into the storage model according to the storage key value includes: storing data except the data marked in the to-be-stored data set as the first data into the storage model according to the storage key value.

In this embodiment, the data except the original data and the change data in the to-be-stored data set can be marked as the first data (e.g., "deleted data" or "0"), and the data except the data marked as the first data in the to-be-stored data set is stored into the storage model according to the storage key value. Alternatively, a delete operation is performed on the data marked as the first data in the to-be-stored data set, and then, the data remaining in the to-be-stored data set after the delete operation is performed according to the storage key value.

In this embodiment, marking is performed on the to-be-stored data in the to-be-stored data set, and the marked data is deleted. The data not deleted in the to-be-stored data set is sorted according to the storage key value, so as to complete storage/archiving. Data organizing/processing can be performed on the to-be-stored data based on write-in space occupied by the to-be-stored data, which can save system resources.

In some alternative implementations of the embodiment described above in combination with FIG. 2, the storing the original data and the change data into the storage model according to the storage key value includes: storing the original data, at least one duration corresponding to the original data, the change data and at least one duration corresponding to the change data into the storage model according to the storage key value, and obtaining a stored data set. Here, the duration is used to represent a time cycle during which data persists. The method for storing data includes: extracting original data from the stored data set according to the duration of the original data; extracting change data from the stored data set according to the duration of the change data; and determining that the stored data set is a target stored data set, in response to determining that a data set composed of the extracted original data and the extracted change data is consistent with the to-be-stored data set.

In this embodiment, the original data, the duration of the original data, the change data and the duration of the change data can be stored according to the storage key value, to obtain the stored data set.

In this embodiment, the duration is used to represent the time cycle in which the data persists. Specifically, the duration of the original data refers to at least one time cycle in which the original data persists, and the duration of the change data refers to at least one time cycle in which the change data persists.

For example, in a certain warehouse, the inventory information of the day is written into the to-be-stored data set every day, the inventory information written in each day from the first day to the fifth day is identical (i.e., the inventory of the warehouse does not change from the first day to the fifth day), the inventory changes on the sixth day (e.g., the inventory increases or the inventory decreases), and the inventory information on the seventh day does not change as compared with the inventory information on the sixth day. Accordingly, the original data corresponds to 5 durations, which are respectively the first day, the second day, the third day, the fourth day and the fifth day, and the change data corresponds to 2 durations, which are respectively the sixth day and the seventh day. It can be appreciated that when the data changes a plurality of times, there may be a plurality of sets of change data, and each set of change data may correspond to a plurality of durations (e.g., a first set of change data corresponds to the sixth day and the seventh day, and a second set of change data corresponds to the eighth day and the ninth day).

In this embodiment, the original data can be extracted from the stored data set according to the durations of the original data, and the change data can be extracted from the stored da a set according to the durations of the change data. If it is determined that the data set composed of the extracted original data and the extracted change data is consistent with the to-be-stored data set, it can be determined that the stored data set is the target stored data set, that is, it can be determined that the data stored in the stored data set passes a data verification.

It can be appreciated that the to-be-stored data is data that is periodically written into the to-be-stored data set (e.g., the network detection data of the day that is written into the data set every day, or the inventory information of the day that is written into the data set every day) and the stored data set stores the original data, the durations of the original data, the change data and the durations of the change data (e.g., an initial inventory, each duration corresponding to the initial inventory, a changed inventory and each duration corresponding to the changed inventory). If the data set spliced/constructed by a piece of original data that is extracted from the stored data set according to each duration of the original data and a piece of change data that is extracted from the stored data set according to each duration of the change data (e.g., pieces of original data are spliced according to the corresponding durations one by one, and pieces of change data are spliced according to the corresponding durations one by one) is consistent with the to-be-stored data set, it can be determined that the stored data set stores all data in the to-be-stored data set, the information stored in the stored data set is accurate, or the data in the stored data set passes the verification.

In this embodiment, the method of determining whether the data set composed of the extracted original data and the extracted change data is consistent with the to-be-stored data set may includes: determining whether the data amounts of the data corresponding to each duration in the two data sets are consistent, or determining whether the information represented by the data corresponding to each duration in the two data sets is consistent.

In this embodiment, by performing the data verification on the stored data set, the accuracy of storing data can be improved.

In some alternative implementations of the embodiment described above in combination with FIG. 2, the method for storing data includes: determining a database parameter according to a data feature of data in the to-be-stored data set. The storing the original data and the change data into the storage model includes: updating the storage model using the database parameter; and storing the original data and the change data into an updated storage model.

In this embodiment, the database parameter for storing the data having the data feature can be determined according to the data feature of the data in the to-be-stored data set, and the storage model for storing the data having the data feature can be updated using the database parameter.

As an example, if there is a low precision requirement on the data in the to-be-stored data set, a database parameter of a storage compression ratio of the storage model can be adjusted to be higher, to improve the efficiency of storing data and save the storage space. As another example, if the amount of the data in the to-be-stored data set is greater than a preset threshold value, a data parameter of the number of read/write threads of the storage model can be adjusted to be higher, to improve the efficiency of storing data.

In this embodiment, the parameter of the storage model is determined according to the data feature of the data in the to-be-stored data set, and the parameter of the storage model is optimized based on the data feature of the data that is to be stored into the storage model, which can improve the efficiency of storing data.

Figure 3:
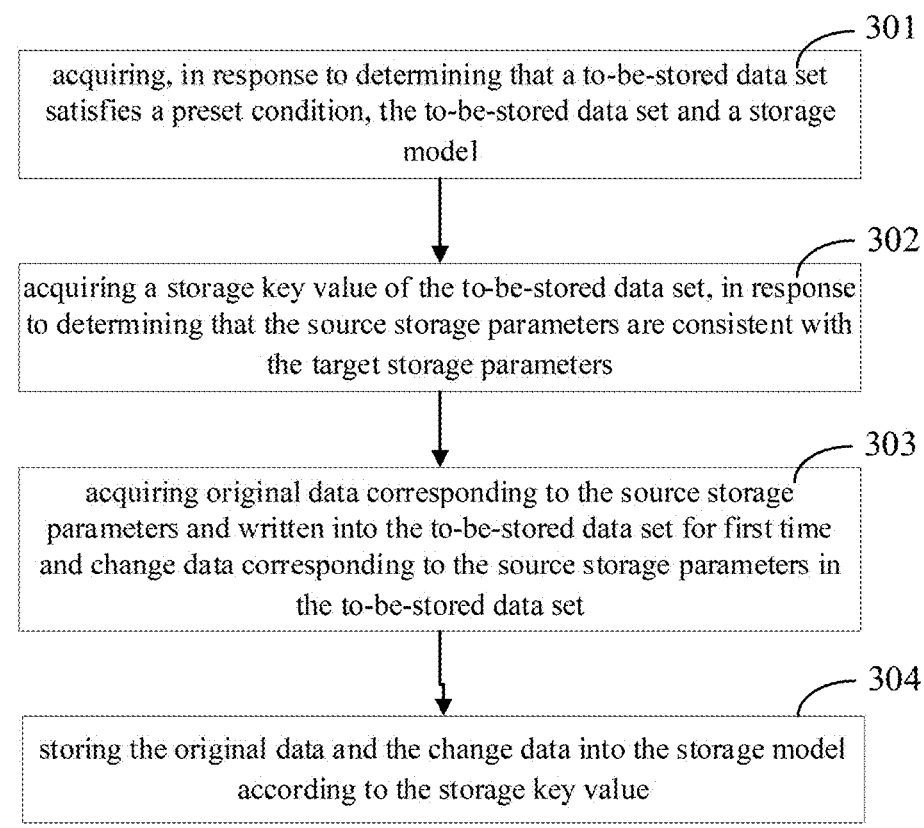
FIG. 3 is a flowchart of an embodiment of the method fox storing data according to the present disclosure.

Further referring to FIG. 3, FIG. 3 illustrates a flow 300 of an embodiment of the method for storing data according to the present disclosure, including the following steps.

Step 301, acquiring, in response to determining that a to-be-stored data set satisfies a preset condition, the to-be-stored data set and a storage model. Here, the to-be-stored data set comprises source storage parameters, and the storage model comprises target storage parameters. Here, the preset condition comprises at least one of: a changing speed of data in the to-be-stored data set being less than a preset threshold, or an amount of the data in the to-be-stored data set being greater than a preset data amount.

In this embodiment, after determining that the to-be-stored data set satisfies the preset condition, an executing body (e.g., the server 105 shown in FIG. 1) of the method for storing data acquires the to-be-stored data set and the storage model.

In this embodiment, the preset condition may refer to that the changing speed of the data in the to-be-stored data set is less than the preset threshold. For example, in the to-be-stored data set, a ratio of an amount of data changed each day to the total amount of the data is less than a preset ratio (e.g., 1% or an other percentage value). The preset condition may refer to that the amount of the data in the to-be-stored data set is greater than the preset data amount. For example, the amount of the data in the to-be-stored data set is greater than 40 TB (or an other data amount).

Step 302, acquiring a storage key value of the to-be-stored data set, in response to determining that the source storage parameters are consistent with the target storage parameters.

Step 303, acquiring original data corresponding to the source storage parameters and written into the to-be-stored data set for first time and change data corresponding to the source storage parameters in the to-be-stored data set.

Step 304, storing the original data and the change data into the storage model according to the storage key value.

In this embodiment, the descriptions for step 302, step 303 and step 304 are consistent with the descriptions for step 202, step 203 and step 204, and thus will not be repeated here.

According to the method for storing data provided in this embodiment, before the method for storing data according to the embodiment of FIG. 2 is performed, it is required to first determine whether the to-be-stored data in the to-be-stored data set satisfies the preset condition, that is, whether the changing speed of the to-be-stored data is less than, the preset threshold or whether the amount of the to-be-stored data is greater than the preset data amount. A utilization rate of storage resources when the method for storing data in the embodiment of FIG. 2 is applied for data storage can be improved.

It should be noted that, after it is determined that the to-be-stored data set satisfies the preset condition, the method in the embodiments of rig. 2 is applicable to the method of the embodiment of FIG. 3.

Figure 4:
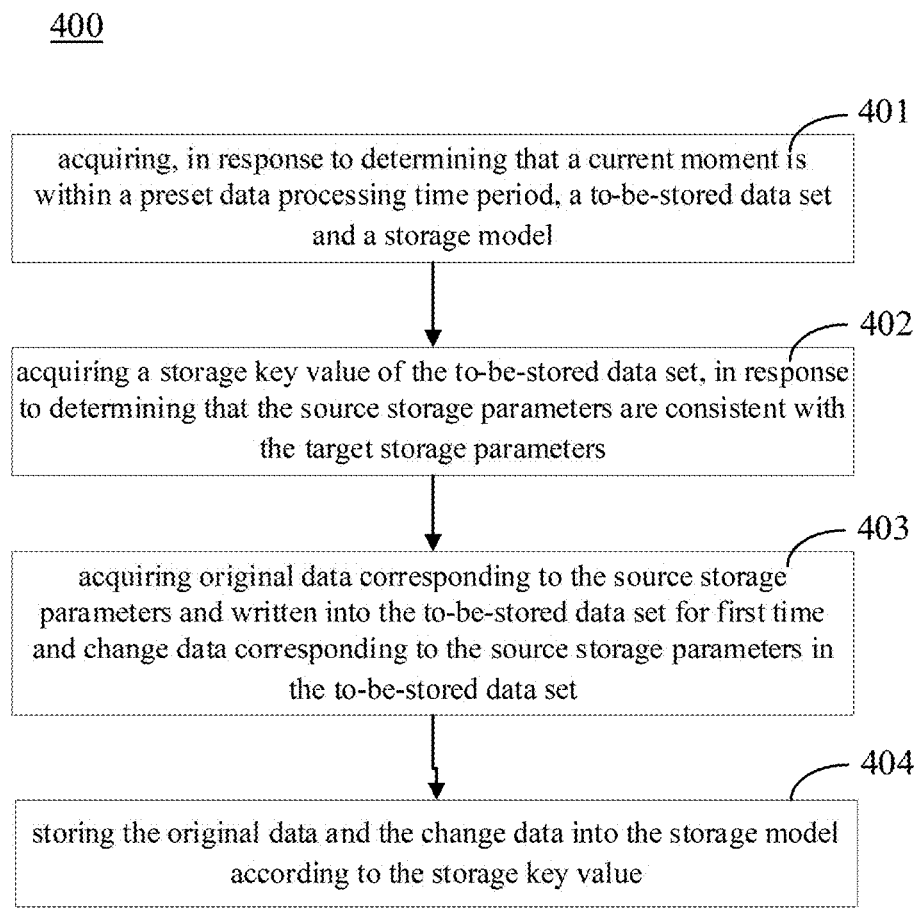
FIG. 4 is a flowchart of an embodiment of the method for storing data according to the present disclosure.

Further referring to FIG. 4, FIG. 4 illustrates a flow 400 of an embodiment of the method for storing data according to the present disclosure, including the following steps.

Step 401, acquiring, in response to determining that a current moment is within a preset data processing time period, a to-be-stored data set and a storage model. Here, the to-be-stored data set comprises source storage parameters, and the storage model comprises target storage parameters.

In this embodiment, when determining that the current moment is within the preset data processing time period, an executing body (e.g., the server 105 shown in FIG. 1) of the method for storing data acquires the to-be-stored data set and the storage model. Here, the preset data processing time period is a preset time period during which the data in the to-be-stored data set is stored into the storage model, that is, a time period during which a data archiving operation is performed on the data in the to-be-stored data set. The preset data processing time period may be a time period different from a period during which the to-be-stored data in the to-be-stored data set is generated. As an example, if the to-be-stored data is order data of a certain e-commerce platform, since the order data is usually generated in a day-time period, a night-time period may be used as the preset data processing time period. As another example, if the to-be-stored data is a system data stream generated when a network provider upgrades a device, since the network provider usually upgrades devices thereof in a night-time period, a day-time period may be used as the preset data processing period.

Step 402, acquiring a storage key value of the to-be-stored data set, in response to determining that the source storage parameters are consistent with the target storage parameters.

Step 403, acquiring original data corresponding to the source storage parameters and written into the to-be-stored data set for first time and change data corresponding to the source storage parameters in the to-be-stored data set.

Step 404, storing the original data and the change data into the storage model according to the storage key value.

In this embodiment, the descriptions for step 402, step 403 and step 404 are consistent with the descriptions for step 202, step 203 and step 204, and thus will not be repeated here.

According to the method for storing data provided in this embodiment, before the method for storing data according to the embodiment of FIG. 2 is performed, it is required to first determine whether the current moment is within the preset data processing time period, to store/archive the data in the to-be-stored data set within the preset data processing time period, which can stagger a data storage/data archive time period from a time period during which the data in the to-be-stored data set is written or a time period during which the to-be-stored data is generated, thereby preventing the resources (e.g. server computing resources, or communication resources) required to execute main transactions (the to-be-stored data is generated only when the main transactions are executed) from being occupied by the data storage operation.

It should be noted that, after it is determined that the current moment is within the preset data processing time period, the method in the embodiments of FIG. 2 is applicable to the method of the embodiment of FIG. 4.

Figure 5:
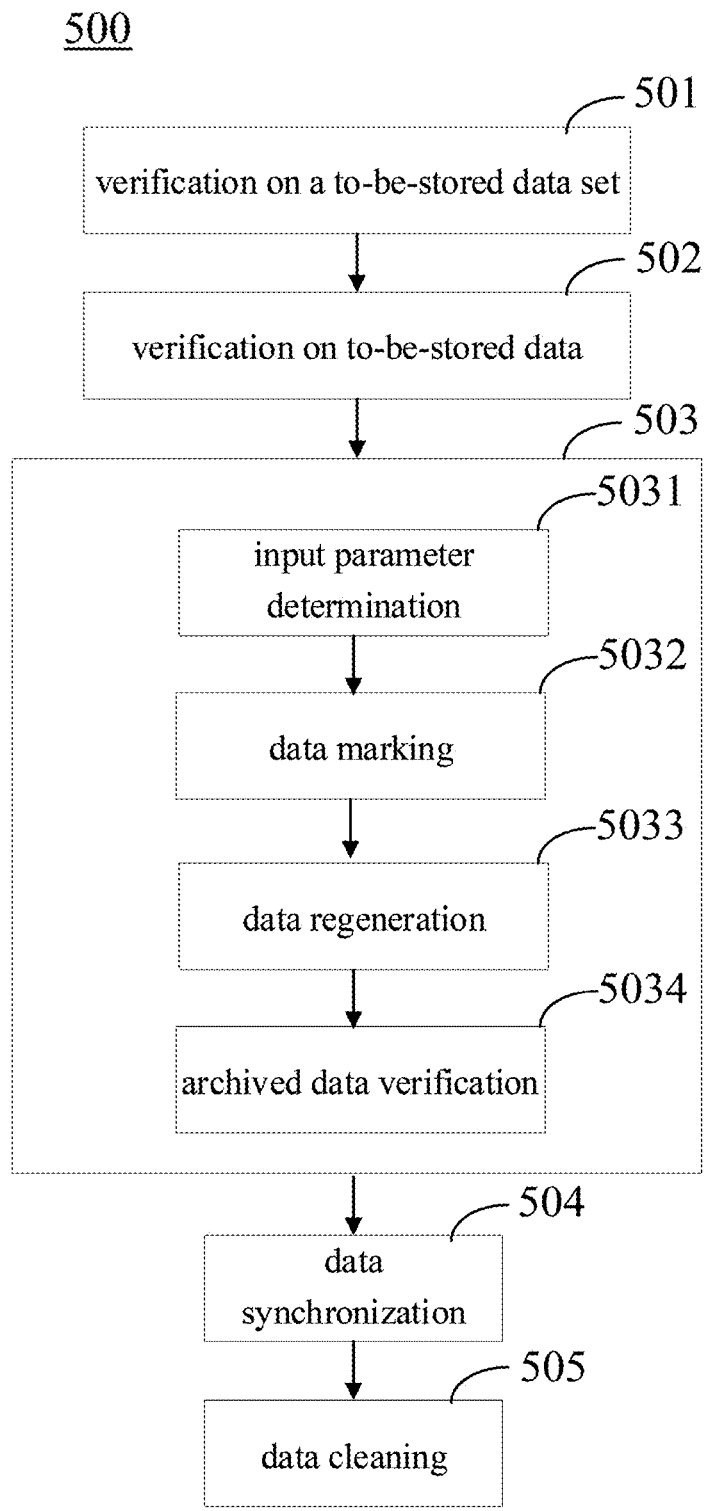
FIG. 5 is a flowchart of an application scenario of the method for storing data according to the present disclosure.

In some application scenarios, as shown in FIG. 5, FIG. 5 illustrates a specific application scenario 500 of the method for storing data, including the following steps.

Step 501 includes a verification on a to-be-stored data set. That is, an executable object is determined, which is to determine whether data storage can be performed on the to-be-stored data set using the method for storing data. It is possible to determine whether the data storage amount thereof reaches a certain scale, for example, exceeds 100 TB, and determine whether the data in the to-be-stored data set is slowly changed, for example, the proportion of the number of records changed per day to the total number of records is less than 1%.

Step 502 includes a verification on to-be-stored data. Source storage parameters in the to-be-stored data set and target storage parameters in a storage model are acquired, and a storage parameter that causes inconsistency between the source storage parameters and the target storage parameters is determined as a missing parameter. If the missing parameter does not exist in the to-be-stored data set, the to-be-stored data corresponding to the missing parameter can be acquired according to an original acquisition approach of the to-be-stored data set, and the missing parameter and the corresponding to-be-stored data can be supplemented to the to-be-stored data set to ensure the integrity of the to-be-sored data set before the data is stored. If the missing parameter does not exist in the storage model, the missing parameter can be added to the storage model to determine the consistency of the target storage parameters in the storage model and the source storage parameters.

Step 503 includes data processing, mainly including: an input parameter determination, data marking, data re-sorting, and an archived data verification.

Step 5031 includes the input parameter determination, for determining a transaction primary key, a data processing time range, a parameter of a storage database, a number of archive days, and a storage key value.

The transaction primary key is determined according to a transaction associated with the to-be-stored data set. For example, an order number may be determined as a transaction primary key of to-be-stored data associated with an e-commerce platform. The transaction primary key is a basis for determining whether the record has changed. That is, the determination is performed on the basis of whether the information of the transaction primary key is consistent in different recording periods and whether the transaction primary key has changed.

The data processing time range is used to determine a time range in which the method for storing data can be performed. Since the resources of a server cluster are limited, and the batch processing for historical data (i.e., the to-be-stored data) will occupy the resources of the server cluster, it is required to avoid a main time period (e.g., 10:00-22:00) during which the server cluster generates transaction data, so as not to affect the generation of the transaction data. If it is found that a storage task is started at a time outside the time period, the execution of the task is forced to stop.

The parameter of the storage database (i.e., the storage model) is a parameter used to optimize the storage database for each to-be-stored data set, thus ensuring the efficiency of storing data.

The number of archive days is used to represent a time period of the amount of data stored each time (e.g., the data in which days is stored/the data in which months is stored), and the parameter can be determined according to the amount of the data in the to-be-stored data set or the size of the storage space of the storage database.

The storage key value is obtained by performing to sampling statistics on commonly used fields to acquire the distributions thereof, so as to screen out a filed having a high compression ratio. Here, the storage key value may be determined according to the concentration of the data distribution corresponding to the fields. The more concentrated the data distribution is, the higher the compression ratio of the corresponding field is. For example, in a commodity model, as a sorting field, the compression ratio of the first-level category of an item is higher than the compression ratio of a third-level category.

Step 5032 includes the data marking. The earliest data before the change (i.e., the original data) and the data after the change (i.e., the change data) in the to-be-stored data set are retained, and the data in between is marked as "deleted." For example, the data in the to-be-stored data set refers to the data information of the inventory in the last 7 days, and the information refers to that the inventory does not change from the first day to the fifth day, changes on the sixth day, and does not change on the seventh day. Accordingly, the processing result is that, except the first day and the sixth day, the data in the other 5 days is marked as "deleted."

Step 5033 includes data regeneration. After the data marked as deleted is deleted according to the result of the data marking, re-sorting is performed on the data according to the storage key value, and then the data is written into the corresponding archive storage space (a corresponding storage model, or a corresponding storage unit in the storage model), thus completing the storage for the to-be-stored data. In this step, the data may be stored in an ORC (Optimized Row Columnar) format to further reduce the storage occupancy ratio of the storage model.

Step 5034 includes the archived data verification, which is used to ensure the consistency of the data in the to-be-stored data set and the stored data. In this step, the consistency can be determined by determining whether the amount of the data before storage is consistent with the amount of the data after the storage (i.e., whether the amount of the data in the to-be-stored data set is consistent with the amount of the data in the storage model), or by determining whether each record in the data before the storage is consistent with each record in the data after the storage.

Step 504 includes data synchronization. Whether the to-be-stored data set is backed up in another server cluster is determined. If the to-be-stored data set is backed up, the data obtained after the storage (or the storage model) is also backed up in this server cluster to implement the data synchronization.

Step 505 includes data cleaning. After the storage/archiving for the data in the to-be-stored data set is completed through the above steps, the to-be-stored data set is deleted to release server resources.

Figure 6:
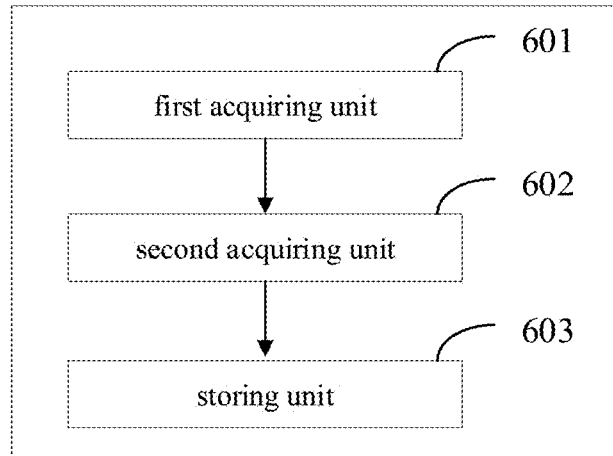
FIG. 6 is a schematic structural diagram of an embodiment of an apparatus for storing data according to the present disclosure.

Further referring to FIG. 6, as an implementation of the method shown in the above drawings, the present disclosure provides an embodiment of an apparatus for storing data. The embodiment of the apparatus corresponds to the embodiment of the method shown in FIG. 2, and the apparatus may be applied in various electronic devices.

As shown in FIG. 6, an apparatus 600 for storing data in this embodiment includes: a first acquiring unit 601, a second acquiring unit 602, a third acquiring unit 603 and a storing unit 604. Here, the first acquiring unit is configured to acquire a to-be-stored data set and a storage model, the to-be-stored data set comprising source storage parameters, and the storage model comprising target storage parameters. The second acquiring unit is configured to acquire a storage key value of the to-be-stored data set, in response to determining that the source storage parameters are consistent with the target storage parameters. The third acquiring unit is configured to acquire original data corresponding to the source storage parameters and written into the to-be-stored data set for first time and change data corresponding to the source storage parameters in the to-be-stored data set. The storing unit is configured to store the original data and the change data into the storage model according to the storage key value.

In some embodiments, the apparatus for storing data comprises: a data verifying unit, configured to determine a missing parameter using the source storage parameters and the target storage parameters, in response to determining that the source storage parameters are inconsistent with the target storage parameters. Here, the missing parameter comprises: a storage parameter existing in the to-be-stored data set but not existing in the storage model, or a storage parameter not existing in the to-be-stored data set but existing in the storage model.

In some embodiments, the apparatus for storing data comprises: a first data verifying module, configured to add the missing parameter to the storage model in response to determining that the missing parameter does not exist in the storage model; or acquire, in response to determining that the missing parameter does not exist in the to-be-stored data set, to-be-stored data corresponding to the missing parameter using an original acquiring approach of the to-be-stored data set, and add the missing parameter and the to-be-stored data corresponding to the missing parameter to the to-be-stored data set.

In some embodiments, the second acquiring unit comprises: an acquiring module, configured to, for each preset storage key value in at least one preset storage key value, acquire a distribution result of to-be-stored data in the to-be-stored data set after clustering is performed on the to-be-stored data according to the preset storage key value; and a determining module, configured to determine that the preset storage key value is a target storage key value, in response to determining that the distribution result satisfies a preset condition.

In some embodiments, the apparatus comprises: a marking module, configured to mark data data set except the original data and the change data in the to-be-stored as first data. The storing unit comprises: a first storing module, configured to store data except the data marked in the to-be-stored data set as the first data into the storage model according to the storage key value.

In some embodiments, the storing unit comprises: a second storing module, configured to store the original data, at least one duration corresponding to the original data, the change data and at least one duration corresponding to the change data into the storage model according to the storage key value, and obtain a stored data set. Here, the duration is used to represent a time cycle in which data persists. The apparatus comprises: a first extracting module, configured to extract original data from the stored data set according to the duration of the original data; a second extracting module, configured to extract change data from the stored data set according to the duration of the change data; and a validating module, configured to determine that the stored data set is a target stored data set, in response to determining that a data set composed of the extracted original data and the extracted change data is consistent with to-be-stored data in the to-be-stored data set.

In some embodiments, the apparatus for storing data comprises: a database parameter acquiring unit, configured to determine a database parameter according to a data feature of data in the to-be-stored data set. The storing unit comprises: an updating module, configured to update the storage model using the database parameter; and a third storing module, configured to store the original data and the change data into an updated storage model.

The units in the above apparatus 600 correspond to the steps in the method described with reference to FIG. 2. Accordingly, the operations and features described above for the method for storing data and their technical effects are also applicable to the apparatus 600 and the units contained therein, and thus will not be repeated here.

Figure 7:
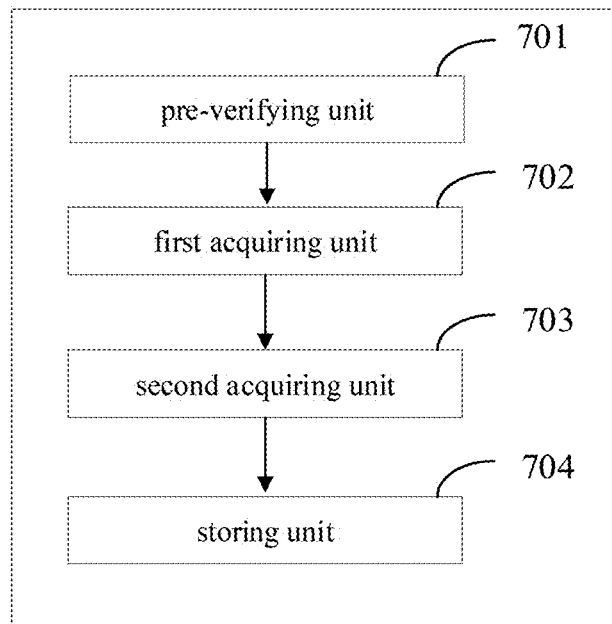
FIG. 7 is a schematic structural diagram of an embodiment of the apparatus for storing data according to the present disclosure.

Further referring to FIG. 7, as an implementation of the method shown in the above drawings, the present disclosure provides an embodiment of an apparatus for storing data. The embodiment of the apparatus corresponds to the embodiment of the method shown in FIG. 3, and the apparatus may be applied in various electronic devices.

As shown in FIG. 7, an apparatus 700 for storing data in this embodiment includes: a pre-verifying unit 701, a first acquiring unit 702, a second acquiring unit 703 and a storing unit 704. Here, the pre-verifying unit is configured to acquire, in response to determining that a to-be-stored data set satisfies a preset condition, the to-be-stored data set and a storage model. Here, the to-be-stored data set comprises source storage parameters, and the storage model comprises target storage parameters. Here, the preset condition comprises at least one of: a changing speed of data in the to-be-stored data set being less than a preset threshold, or an amount of the data in the to-be-stored data set being greater than a preset data amount. The first acquiring unit is configured to acquire a storage key value of the to-be-stored data set, in response to determining that the source storage parameters are consistent with the target storage parameters. The second acquiring unit is configured to acquire original data corresponding to the source storage parameters and written into the to-be-stored data set for first time and change data corresponding to the source storage parameters in the to-be-stored data set. The storing unit is configured to store the original data and the change data into the storage model according to the storage key value.

The units in the above apparatus 700 correspond to the steps in the method described with reference to FIG. 3. Accordingly, the operations and features described above for the method for storing data and their technical effects are also applicable to the apparatus 700 and the units contained therein, and thus will not be repeated here.

Figure 8:
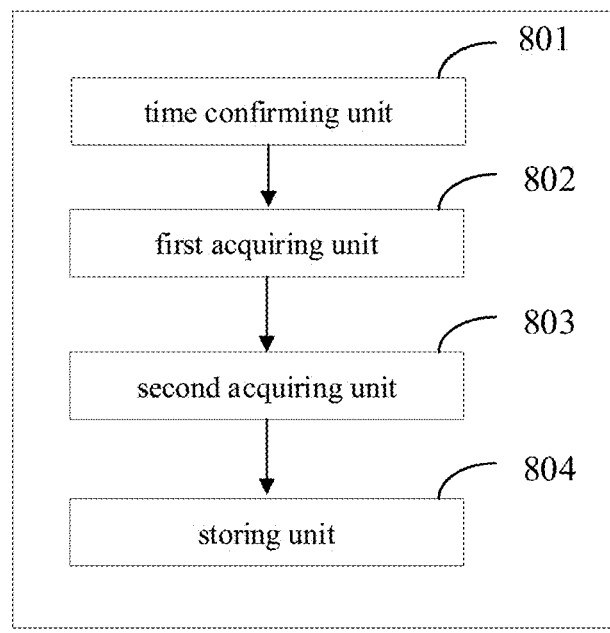
FIG. 8 is a schematic structural diagram of an embodiment of the apparatus for storing data according to the present disclosure.

Further referring to FIG. 8, as an implementation of the method shown in the above drawings, the present disclosure provides an embodiment of an apparatus for storing data. The embodiment of the apparatus corresponds to the embodiment of the method shown in FIG. 4, and the apparatus may be applied in various electronic devices.

As shown in FIG. 8, an apparatus 800 for storing data in this embodiment includes: a time confirming unit 801, a first acquiring unit 802, a second acquiring unit 803 and a storing unit 804. Here, the time confirming unit is configured to acquire, in response to determining that a current moment is within a preset data processing time period, a to-be-stored data set and a storage model. Here, the to-be-stored data set comprises source storage parameters, and the storage model comprises target storage parameters. The first acquiring unit is configured to acquire a storage key value of the to-be-stored data set, in response to determining that the source storage parameters are consistent with the target storage parameters. The second acquiring unit is configured to acquire original data corresponding to the source storage parameters and written into the to-be-stored data set for first time and change data corresponding to the source storage parameters in the to-be-stored data set. The storing unit is configured to store the original data and the change data into the storage model according to the storage key value.

The units in the above apparatus 800 correspond to the steps in the method described with reference to FIG. 4. Accordingly, the operations and features described above for the method for storing data and their technical effects are also applicable to the apparatus 800 and the units contained therein, and thus will not be repeated here.

According to embodiments of the present disclosure, the present disclosure further provides an electronic device and a readable storage medium.

Figure 9:
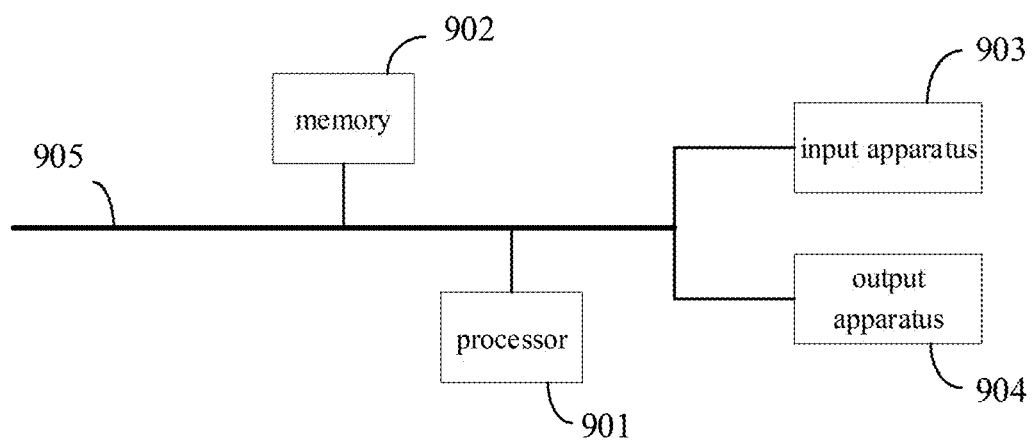
FIG. 9 is a block diagram of an electronic device used to implement the method for storing data according to embodiments of the present disclosure.

As shown in FIG. 9, FIG. 9 is a block diagram of an electronic device 900 of the method for storing data according to the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 9, the electronic device includes: one or more processors 901, a memory 902, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations, for example, as a server array, a set of blade servers, or a multi-processor system. In FIG. 9, one processor 901 is used as an example.

The memory 902 is a non-transitory computer readable storage medium provided by the present disclosure. The memory stores instructions executable by at least one processor, so that the at least one processor performs the method for recognizing an image provided by the present disclosure. The non-transitory computer readable storage medium of the present disclosure stores computer instructions for causing the computer to perform the method for recognizing an image provided by the present disclosure.

The memory 902, as a non-transitory computer readable storage medium, may be used to store non-transitory software programs, non-transitory computer executable programs and modules, such as program instructions/modules corresponding to the method for recognizing an image in embodiments of the present disclosure (for example, the first acquiring unit 601, the second acquiring unit 602, the third acquiring unit 603 and the storing unit 604 as shown in FIG. 6). The processor 901 executes the non-transitory software programs, instructions, and modules stored in the memory 902 to execute various functional applications and data processing of the server, that is, to implement the method for storing data in the foregoing method embodiments.

The memory 902 may include a storage program area and a storage data area, where the storage program area may store an operating system and at least one function required application program; and the storage data area may store data created by the use of the electronic device for storing data, etc. In addition, the memory 902 may include a high-speed random access memory, and may also include a non-transitory memory, such as at least one magnetic disk storage device, a flash memory device, or other non-transitory solid-state storage devices. In some embodiments, the memory 902 may optionally include memories remotely provided with respect to the processor 901, and these remote memories may be connected to the electronic device for storing data through a network. Examples of the above network include but are not limited to the Internet, intranet, local area network, mobile communication network, and combinations thereof.

The electronic device of the method for recognizing an image may further include: an input apparatus 903 and an output apparatus 904. The processor 901, the memory 902, the input apparatus 903, and the output apparatus 904 may be connected through a bus or in other methods. In FIG. 9, connection through a bus 905 is used as an example.

The input apparatus 903 may receive input digital or character information, and generate key signal inputs related to user settings and function control of the electronic device of storing data, such as touch screen, keypad, mouse, trackpad, touchpad, pointing stick, one or more mouse buttons, trackball, joystick and other input apparatuses. The output apparatus 904 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and technologies described above herein may be implemented in a digital electronic circuit system, an integrated circuit system, an application specific integrated circuit (ASIC), computer hardware, firmware, software, and/or a combination thereof. The various implementations may include: an implementation in one or more computer programs that are executable and/or interpretable on a programmable system including at least one programmable processor, which may be a special-purpose or general-purpose programmable processor, and may receive data and instructions from, and transmit data and instructions to, a storage system, at least one input apparatus, and at least one output device.

These computing programs (also known as programs, software, software applications, or code) include machine instructions for programmable processors and can be implemented using advanced procedures and/or object-oriented programming languages, and/or assembly/machine languages. As used in this disclosure, the terms "machine readable medium" and "computer readable medium" refer to any computer program product, device, and/or device (such as a disk, optical disk, memory, programmable logic device (PLD)) used to provide machine instructions and/or data to a programmable processor, including machine readable medium that receives machine instructions as machine readable signals. The term "machine readable signal" refers to any signal used to provide machine instructions and/or data to a programmable processor.

To provide interaction with a user, the systems and technologies described herein may be implemented on a computer that is provided with: a display apparatus (e.g., a CRT (cathode ray tube) or a LCD (liquid crystal display) monitor) configured to display information to the user; and a keyboard and a pointing apparatus (e.g., a mouse or a trackball) by which the user can provide an input to the computer. Other kinds of apparatuses may also be configured to provide interaction with the user. For example, feedback provided to the user may be any form of sensory feedback (e.g., visual feedback, auditory feedback, or haptic feedback); and an input may be received from the user in any form (including an acoustic input, a voice input, or a tactile input).

The systems and technologies described herein may be implemented in a computing system (e.g., as a data server) that includes a back-end component, or a computing system (e.g., an application server) that includes a middleware component, or a computing system (e.g., a user computer with a graphical user interface or a web browser through which the user can interact with an implementation of the systems and technologies described herein) that includes a front-end component, or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and usually interact via a communication network. The relationship between the client and the server arises by virtue of computer programs that run on corresponding computers and have a client-server relationship with each other.

It should be understood that the various forms of processes shown above may be used to reorder, add, or delete steps. For example, the steps disclosed in the present disclosure may be executed in parallel, sequentially, or in different orders, as long as the desired results of the technical solutions disclosed in the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A method for storing data, comprising:
   acquiring a to-be-stored data set and a storage model, the to-be-stored data set comprising source storage parameters, and the storage model comprising target storage parameters, wherein the to-be-stored data set is a data set to be stored into the storage model, and the storage model is data storage carrier for storing data;
   acquiring a target storage key value of the to-be-stored data set, in response to determining that the source storage parameters of the to-be-stored data set are consistent with the target storage parameters of the storage model;
   acquiring original data corresponding to the source storage parameters and written into the to-be-stored data set for first time, and acquiring change data corresponding to the source storage parameters in the to-be-stored data set; and
   storing the original data and the change data into the storage model according to the target storage key value,
   wherein the acquiring a target storage key value of the to-be-stored data set comprises:
   for each preset storage key value in a plurality of preset storage key values, clustering the to-be-stored data set into categories according to the preset storage key value, and determining the preset storage key value as the target storage key value in response to determining that the categories obtained by clustering the to-be-stored data set satisfy a preset condition, wherein the preset condition includes: a number of the categories obtained by clustering the to-be-stored data set is not greater than a preset number.

2. The method according to claim 1, further comprising:
   determining a missing parameter using the source storage parameters and the target storage parameters, in response to determining that the source storage parameters are inconsistent with the target storage parameters, wherein the missing parameter comprises: a storage parameter existing in the to-be-stored data set but not existing in the storage model, or a storage parameter not existing in the to-be-stored data set but existing in the storage model.

3. The method according to claim 2, further comprising:
   adding the missing parameter to the storage model in response to determining that the missing parameter does not exist in the storage model; or
   acquiring, in response to determining that the missing parameter does not exist in the to-be-stored data set, to-be-stored data corresponding to the missing parameter using an original acquiring approach of the to-be-stored data set, and adding the missing parameter and the to-be-stored data corresponding to the missing parameter to the to-be-stored data set,
   wherein the original acquisition approach of the to-be-stored data set includes: reading order flow information of an e-commerce platform, or reading the customer order information of a logistics system.

4. The method according to claim 1, wherein the target storage key value is: an index keyword of to-be-stored data, a key value in a key-value pair database, or a data tag obtained by dividing the to-be-stored data set into the categories.

5. The method according to claim 1, further comprising:
   marking data except the original data and the change data in the to-be-stored data set as first data,
   wherein the storing the original data and the change data into the storage model according to the target storage key value comprises:
   storing data except the data marked as the first data in the to-be-stored data set into the storage model according to the target storage key value.

6. The method according to claim 1, wherein the storing the original data and the change data into the storage model according to the target storage key value comprises:
   storing the original data, at least one duration corresponding to the original data, the change data and at least one duration corresponding to the change data into the storage model according to the target storage key value, and obtaining a stored data set, wherein the duration is used to represent a time cycle in which data persists, and
   the method comprises:
   extracting original data from the stored data set according to the duration of the original data;
   extracting change data from the stored data set according to the duration of the change data; and
   determining that the stored data set is a target stored data set, in response to determining that a data set composed of the extracted original data and the extracted change data is consistent with to-be-stored data in the to-be-stored data set.

7. The method according to claim 1, further comprising:
   determining a database parameter according to a data feature of data in the to-be-stored data set, wherein the data feature comprises: a precision requirement on the data in the to-be-stored data set, and the database parameter comprises: a storage compression ratio,
   wherein the storing the original data and the change data into the storage model comprises:
   updating the storage model using the database parameter; and
   storing the original data and the change data into an updated storage model.

8. The method according to claim 1, comprising:
   performing the method according to claim 1, in response to determining that a to-be-stored data set satisfies a preset condition,
   wherein the preset condition comprises at least one of: a changing speed of data in the to-be-stored data set being less than a preset threshold, or an amount of the data in the to-be-stored data set being greater than a preset data amount.

9. The method according to claim 1, comprising:
   performing the method according to claim 1, in response to determining that a current moment is within a preset data processing time period.

10. An apparatus for storing data, comprising:
    at least one processor; and
    a memory storing instructions, wherein the instructions when executed by the at least one processor, cause the at least one processor to perform operations, the operations comprising:

acquiring a to-be-stored data set and a storage model, the to-be-stored data set comprising source storage parameters, and the storage model comprising target storage parameters, wherein the to-be-stored data set is a data set to be stored into the storage model, and the storage model is data storage carrier for storing data;

acquiring a target storage key value of the to-be-stored data set, in response to determining that the source storage parameters of the to-be-stored data set are consistent with the target storage parameters of the storage model;

acquiring original data corresponding to the source storage parameters and written into the to-be-stored data set for first time, and acquiring change data corresponding to the source storage parameters in the to-be-stored data set; and storing the original data and the change data into the storage model according to the target storage key value, wherein the acquiring a target storage key value of the to-be-stored data set comprises:

for each preset storage key value in a plurality of preset storage key values, clustering the to-be-stored data set into categories according to the preset storage key value, and determining the preset storage key value as the target storage key value in response to determining that the categories obtained by clustering the to-be-stored data set satisfy a preset condition, wherein the preset condition includes: a number of the categories obtained by clustering the to-be-stored data set is not greater than a preset number.

11. The apparatus according to claim 10, comprising:
a pre-verifying unit, configured to perform the operations in response to determining that a to-be-stored data set satisfies a preset condition, wherein the preset condition comprises at least one of: a changing speed of data in the to-be-stored data set being less than a preset threshold, or an amount of the data in the to-be-stored data set being greater than a preset data amount.

12. The apparatus according to claim 10, comprising:
a time confirming unit, configured to perform the operations in response to determining that a current moment is within a preset data processing time period.

13. The apparatus according to claim 10, the operations further comprising:
determining a missing parameter using the source storage parameters and the target storage parameters, in response to determining that the source storage parameters are inconsistent with the target storage parameters, wherein the missing parameter comprises: a storage parameter existing in the to-be-stored data set but not existing in the storage model, or a storage parameter not existing in the to-be-stored data set but existing in the storage model.

14. The apparatus according to claim 13, the operations further comprising:
adding the missing parameter to the storage model in response to determining that the missing parameter does not exist in the storage model; or
acquiring, in response to determining that the missing parameter does not exist in the to-be-stored data set, to-be-stored data corresponding to the missing parameter using an original acquiring approach of the to-be-stored data set, and adding the missing parameter and the to-be-stored data corresponding to the missing parameter to the to-be-stored data set, wherein the original acquisition approach of the to-be-stored data set includes: reading order flow information of an e-commerce platform, or reading the customer order information of a logistics system.

15. The apparatus according to claim 13, the operations further comprising:
marking data except the original data and the change data in the to-be-stored data set as first data, wherein the storing the original data and the change data into the storage model according to the target storage key value comprises:
storing data except the data marked as the first data in the to-be-stored data set into the storage model according to the target storage key value.

16. The apparatus according to claim 13, the operations further comprising:
determining a database parameter according to a data feature of data in the to-be-stored data set, wherein the data feature comprises: an amount of the data in the to-be-stored data set, and the database parameter comprises: a number of read and write threads, wherein the storing the original data and the change data into the storage model comprises:
updating the storage model using the database parameter; and
storing the original data and the change data into an updated storage model.

17. The apparatus according to claim 10, wherein the target storage key value is: an index keyword of to-be-stored data, a key value in a key-value pair database, or a data tag obtained by dividing the to-be-stored data set into the categories.

18. The apparatus according to claim 10, wherein the storing the original data and the change data into the storage model according to the target storage key value comprises:
storing the original data, at least one duration corresponding to the original data, the change data and at least one duration corresponding to the change data into the storage model according to the target storage key value, and obtaining a stored data set, wherein the duration is used to represent a time cycle in which data persists, and the operations further comprise:
extracting original data from the stored data set according to the duration of the original data;
extracting change data from the stored data set according to the duration of the change data; and
determining that the stored data set is a target stored data set, in response to determining that a data set composed of the extracted original data and the extracted change data is consistent with to-be-stored data in the to-be-stored data set.

19. A non-transitory computer readable storage medium, storing a computer instruction, wherein the computer instruction is used to cause a computer to perform operations comprising:
acquiring a to-be-stored data set and a storage model, the to-be-stored data set comprising source storage parameters, and the storage model comprising target storage parameters, wherein the to-be-stored data set is a data set to be stored into the storage model, and the storage model is data storage carrier for storing data;

acquiring a target storage key value of the to-be-stored data set, in response to determining that the source storage parameters of the to-be-stored data set are consistent with the target storage parameters of the storage model;

acquiring original data corresponding to the source storage parameters and written into the to-be-stored data set for first time, and acquiring change data corresponding to the source storage parameters in the to-be-stored data set; and storing the original data and the change data into the storage model according to the target storage key value, wherein the acquiring a target storage key value of the to-be-stored data set comprises:

for each preset storage key value in a plurality of preset storage key values, clustering the to-be-stored data set into categories according to the preset storage key value, and determining the preset storage key value as the target storage key value in response to determining that the categories obtained by clustering the to-be-stored data set satisfy a preset condition, wherein the preset condition includes: a number of the categories obtained by clustering the to-be-stored data set is not greater than a preset number.

20. The non-transitory computer readable medium of claim 19, the operations further comprising:

determining a missing parameter using the source storage parameters and the target storage parameters, in response to determining that the source storage parameters are inconsistent with the target storage parameters, wherein the missing parameter comprises: a storage parameter existing in the to-be-stored data set but not existing in the storage model, or a storage parameter not existing in the to-be-stored data set but existing in the storage model.

\* \* \* \* \*